United States Patent [19]

Smith

[11] Patent Number: 5,291,553
[45] Date of Patent: Mar. 1, 1994

[54] WEATHERPROOF TELEPHONE NETWORK INTERFACE MODULES

[75] Inventor: Thomas J. Smith, Bay Shore, N.Y.
[73] Assignee: Tll Industries, Inc., Copiague, N.Y.
[21] Appl. No.: 866,353
[22] Filed: Apr. 10, 1992
[51] Int. Cl.$^5$ ............................................. H04M 9/00
[52] U.S. Cl. ..................... 379/399; 379/412; 379/387; 379/437; 379/419; 379/438; 379/445; 439/133; 439/709; 439/712; 439/716; 439/718
[58] Field of Search ............... 379/399, 387, 399, 412, 379/438

[56] References Cited

U.S. PATENT DOCUMENTS

| | | | |
|---|---|---|---|
| 4,636,588 | 1/1987 | Nakayama | 379/387 |
| 4,809,323 | 2/1989 | Collins | 379/399 |
| 4,853,960 | 8/1989 | Smith | 379/399 |
| 4,860,350 | 8/1989 | Smith | 379/399 |

Primary Examiner—James L. Dwyer
Assistant Examiner—J. M. Saint-Surin
Attorney, Agent, or Firm—Sachs & Sachs

[57] ABSTRACT

A weatherproof network interface module for providing connection between a customer's equipment and the telephone company owned portion of the customer loop includes an overvoltage protection device disposed therein in addition to the circuitry which provides a prescribed line test termination impedance having particular characteristic signature to the telephone central office when a continuity test is made on a subscriber line and may include an illumination device and test switch for indicating when the telephone company owned portion of the customer loop is in operating order, or may include a device for connecting or disconnecting the telephone company owned portion of the customer loop from the customer loop portion wherein all of terminals are weatherproof (protected from the environment).

10 Claims, 11 Drawing Sheets

WEATHERPROOF TELEPHONE NETWORK INTERFACE MODULES

BACKGROUND OF THE INVENTION

1. Field of the Invention

The present invention relates to network interface modules and in particular to a network interface module that includes overvoltage protection, line termination impedance having a characteristic signature, other means for testing the telephone company owned portion of a customer loop or means for disconnecting the customer's equipment therefrom.

2. Discussion of the Relevant Art

An individual homeowner at present may purchase and install his or her own telephone equipment and related appliances. The homeowner is responsible for the proper operation of the equipment that he/she has installed. The telephone company may not own the equipment in a subscriber's home and therefore will be responsible only for proper service up to the juncture between the telephone lines and the homeowner's premises. Thus, it is necessary to provide a telephone interface apparatus which is capable of readily disconnecting the homeowner's wiring, installed in the premises, from the telephone company's transmission lines so that when trouble occurs, it could readily be isolated to the telephone company's line or the homeowner's house wiring. If a homeowner experiences a problem with his telephone service it is first necessary for him to determine if it is the telephone company's fault and repairs are needed on their lines or equipment, or if the wiring or equipment the homeowner installed requires repairs. Many devices are now available that provide the function of readily disconnecting the home wiring from the telephone company owned portion of the subscriber loop. Typical of these apparatuses is U.S. Pat. No. 4,910,770 issued to Collins, et al on Mar. 20, 1990; U.S. Pat. No. 4,488,008 issued to T. A. Dellinger, et al on Dec. 11, 1984; U.S. Pat. No. 287,583 issued to T. J. Smith, et al on Jan. 6, 1987, and U.S. Pat. No. 4,624,514 issued to Smith on Nov. 25, 1986.

These devices, although providing the necessary function of severing the telephone company owned portion of the customer loop from the homeowner's portion of the customer loop are either inconvenient, capable of handling only a single loop and do not provide overvoltage protection within the module. The instant invention provides a simple, convenient means to provide similar functions for a plurality of telephone lines, includes overvoltage protection within the module and circuitry for adding the signature thereto, is weatherproof and is readily exchangeable with other modules presently in use. The identifying signature impedance appearing across the customer line allows for interrogation by the telephone office. The module is readily replaceable with a minimum of wiring disconnects required.

SUMMARY OF THE INVENTION

It is an object of the present invention to provide a weatherproof network interface module suitable for replacement of existing modules that includes overvoltage protection therein as well as a specific terminating impedance for the telephone line at the juncture where the customer loop becomes the property of the homeowner (subscriber).

It is another object of the present invention to provide a weatherproof telephone network interface module capable of containing within its housing the necessary electronic components needed by the telephone company at the juncture of the homeowner's premises and the telephone company's transmission lines.

It is still yet another object of the present invention to provide a weatherproof telephone network interface module where the homeowner (subscriber) may connect his internal house wiring and auxiliary equipment and may readily disconnect it from the telephone company portion of the customer's loop for isolation purposes and not be subject to receiving any shocks from the telephone line.

It is still yet another object of the present invention to provide a weatherproof telephone network interface module having the above features and be suitable for use with multiple subscriber telephone network interface housings.

It is still yet another object of the present invention to provide a completely sealed weatherproof telephone network interface module which may readily be repaired by the telephone company service people or disposed of and replaced by them.

A weatherproof network interface module suitable for use in a telephone terminal housing, for providing connections between a customer's equipment and the telephone company owned portion of a customer loop, according to the principles of the present invention, comprises: a hollow housing having a rear surface with a protruding portion thereon suitable for cooperating with a ledge provided in a telephone terminal housing, a front surface having a protruding portion for removably mounting the module to the telephone terminal housing, two side surfaces, an open bottom surface and a top surface. A first weatherproof terminal device is disposed on the top surface proximate the front end of the hollow housing having at least a pair of line terminals adapted to receive a pair of wires connected to the telephone company owned portion of the customer's telephone loop. A second weatherproof terminal device is disposed on the top surface proximate the rear surface of the hollow housing, the second terminal device has at least a pair of terminal connections thereon adapted to be connected to the customer's equipment. A third weatherproof terminal device is disposed on the rear surface of the module and has at least a pair of terminal connections thereon adapted to be connected to the customer's equipment. An overvoltage protection device is disposed within the hollow housing and has three terminals; one of the terminals is connected to ground, the second and third terminals are each connected to one of the weatherproof line terminals. A circuit board is disposed within the hollow housing and is connected to the second and third weatherproof customer terminal connections for providing a signature for use by the telephone company when it interrogates the subscriber line.

The foregoing and other objects and advantages will appear from the description to follow. In the description reference is made to the accompanying drawing that forms a part hereof, and in which is shown by way of illustration three specific embodiments in which the invention may be practiced. These embodiments will be described in sufficient detail to enable those skilled in the art to practice the invention, with like numerals being used for similar parts in the three embodiments, and it is to be understood that other embodiments may be utilized and structural changes may be made without departing from the scope of the invention. The following detailed description is, therefore, not to be taken in a limiting sense, and the scope of the present invention is best defined by the appended claims.

BRIEF DESCRIPTION OF THE DRAWING

In order that the invention may be more fully understood, it will now be described, by way of example, with reference to the accompanying drawing in which.

DESCRIPTION OF THE PREFERRED EMBODIMENTS

Figure 1:
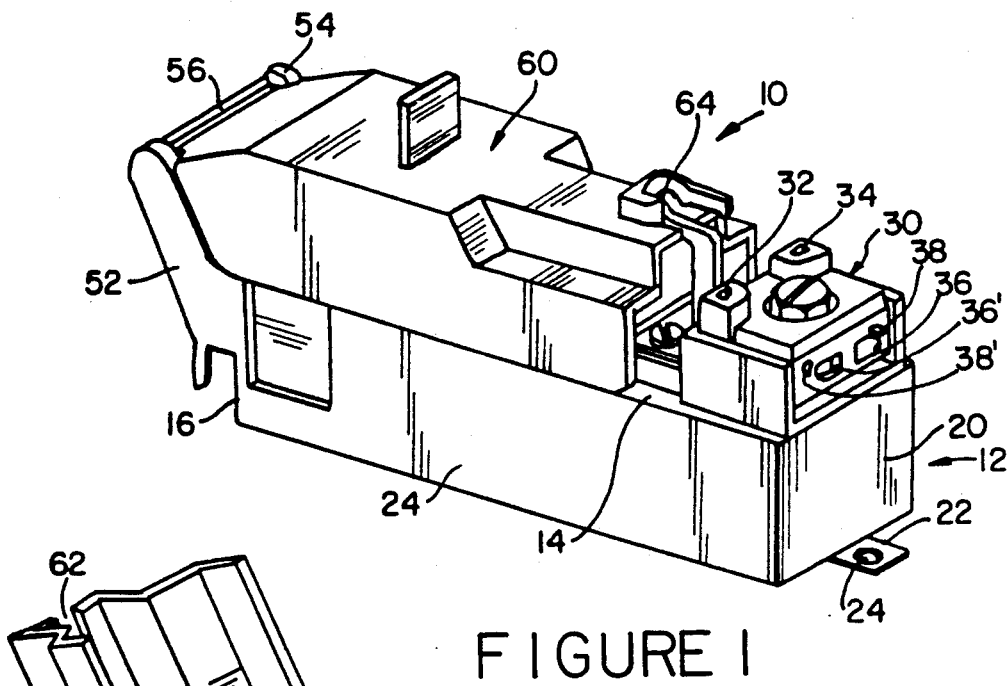
FIG. 1 is a perspective view in elevation of a weatherproof telephone network interface module with its cover closed, according to the principles of the present invention.

Referring now to the figures, and in particular, to FIGS. 1 through 8, there is shown a weatherproof telephone network interface module 10, according to the principles of the present invention, that includes a module housing 12, which has a closed top surface 14, a rear surface 16, which is provided with a protruding portion 18 (see FIG. 6) suitable for cooperating with a ledge or lip provided in a telephone housing terminal, not shown. The module housing 12 also includes a front surface 20 having a protruding or extending portion 22, which may be made out of the same material as the module housing 12 or have affixed therein an L-shaped bracket that is provided with an aperture 25 suitable for receiving a mounting screw which may function as a ground terminal, not shown, and to removably affix the module housing 12 to a flat surface or place it within a telephone terminal housing, not shown. Also included in the module housing 12 are two side surfaces 24 and 26 (see FIGS. 3, 4, 5 and 6) and an open bottom 28.

On the top surface 14 of the module housing 12 proximate the front surface 20 thereof is a weatherproof terminal 30 which is identical in construction to the terminal members 44 and 46 disclosed in U.S. Pat. No. 5,153,911 issued on Oct. 6, 1992 to Thomas J. Smith (application Ser. No. 819,986, filed Jan. 13, 1992). The construction details of the weatherproof terminals 44 and 46 as disclosed in U.S. Pat. No. 5,153,911 referred to above is herewith included in its entirety.

Weatherproof terminal 30 is also seen to include a pair of test terminals 32 and 34, which are adapted to receive test probes, not shown, from a monitoring meter which may be used to measure the voltage appearing on the transmission lines, not shown, which are adapted to be inserted into apertures 36 and 38 and 36' and 38' of the weatherproof terminal 30. The apertures 36 and 38 and 36' and 38' are adapted to receive different wire sizes which may be utilized by the telephone company's line portion of the customer or subscriber's loop.

A second weatherproof terminal 40 is disposed on the top surface 14 of the hollow module housing 12 and is provided with at least a pair of terminal connections, preferably four connections 42, 44, 46 and 48 which are adapted to be connected to the subscriber's terminal equipment, not shown, such as telephone extensions, fax machines, etc. The second weatherproof terminal 40 is disposed on the top surface 14 proximate the rear surface 16 of the module housing 12.

A third weatherproof terminal 50 is disposed on the rear surface 16 of the module also having at least a pair of terminal connections, preferably four, 42', 44', 46' and 48' identical to the terminal connections provided on tho second weatherproof terminal 40. Hereagain, terminal connections 42', 44', 46' and 48' are adapted to be connected to the customer's equipment. The wiring from the input apertures 36 and 38; and 36' and 38' are wired to the tip 36 and ring 38 terminals, respectively, as shown in FIGS. 17, 18 and 19 and are carried completely through to the terminals 42 and 46, respectively, of the customer terminals, also 42', 44' 46' and 48' (see FIGS. 17, 18 and 19).

An extending portion 51 includes a pair of arms 52 and 54 with a cross member 56 extends beyond the rear surface 16 of the module 12. The cross member 56 is adapted to receive a C-shaped portion 58 of the cover 60. Cover 60 is also provided with an open channel 62 which is adapted to cooperate with upright hook member 64 provided on the top surface 14 of the housing 12. When the cover 60 is placed in a closed position and a locking member or rod, not shown, is placed in the open portion 66 of hook member 64 the cover cannot be raised, thus, preventing the unauthorized use of the customer terminals 40 and 50. Cover member 60 and hook member 64 are options which may be utilized or eliminated, since the weatherproof terminals 30, 40 and 50 are adapted to receive wires which are insulated when they are inserted into the terminal apertures, thereby preventing either a telephone technician or the customer from receiving any electrical shocks when they make connections to the terminals 36, 38; 42, 44; 46 and 48.

Disposed within the hollow housing 12 is an overvoltage protection device 70 which has preferably three terminals 72, 74 and 76. Terminals 76 and 72 are provided with an electrically conductive path to line terminals 36 and 38 and are supported in position by brackets 78 and 80. Terminal 74 is connected to ground in a conventional manner. Of course, a thermoplastic sheet, not shown, may be placed between the connecting portion of brackets 78 and 80 and the ground connection is made to terminal 74 so that if the overvoltage protection should overheat a fail-short connection to ground will be provided in a well known manner.

Figure 17:
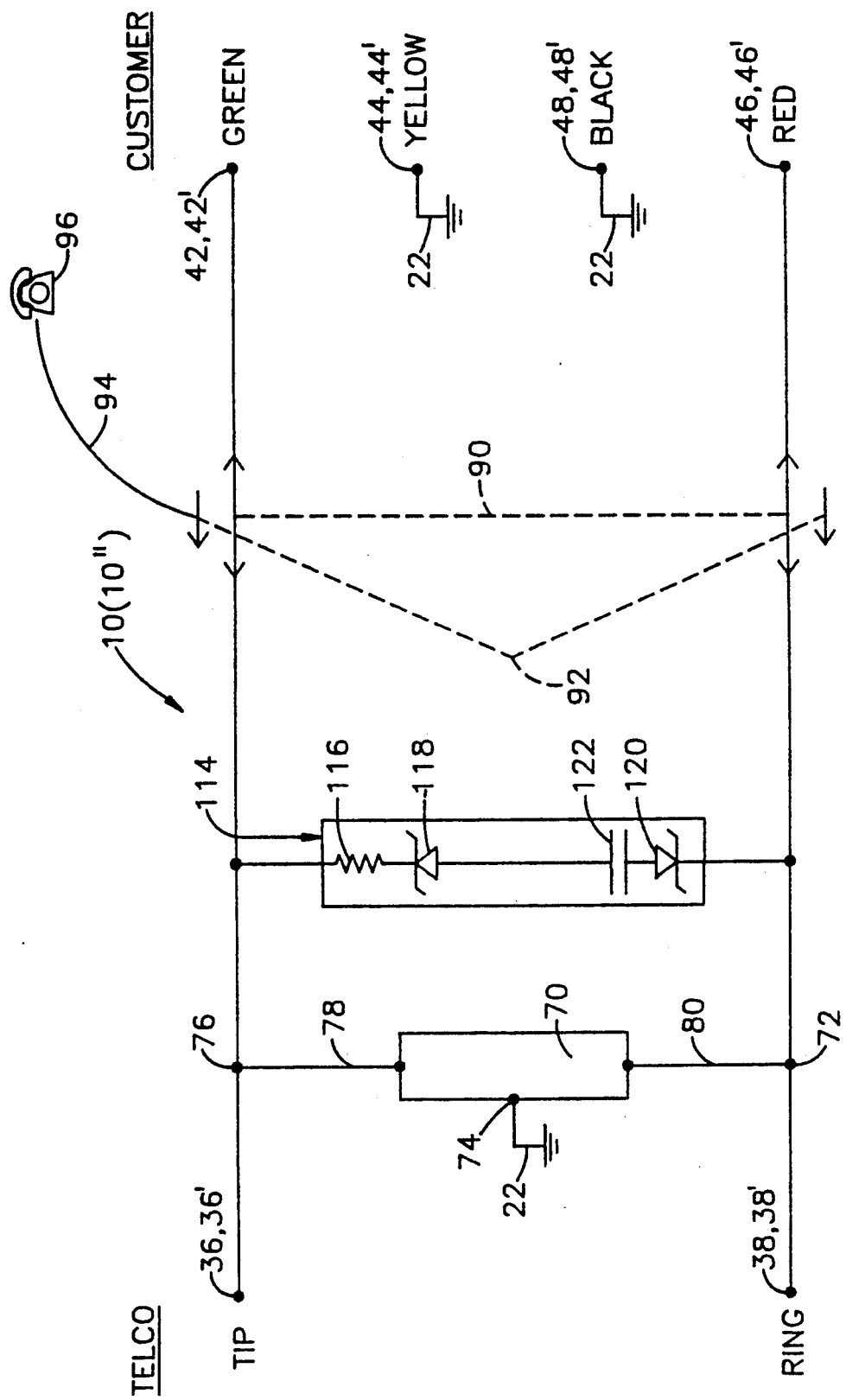
FIG. 17 is an electrical schematic circuit diagram showing the wiring of the first and second alternative embodiments of a weatherproof telephone interface module.
Figure 18:
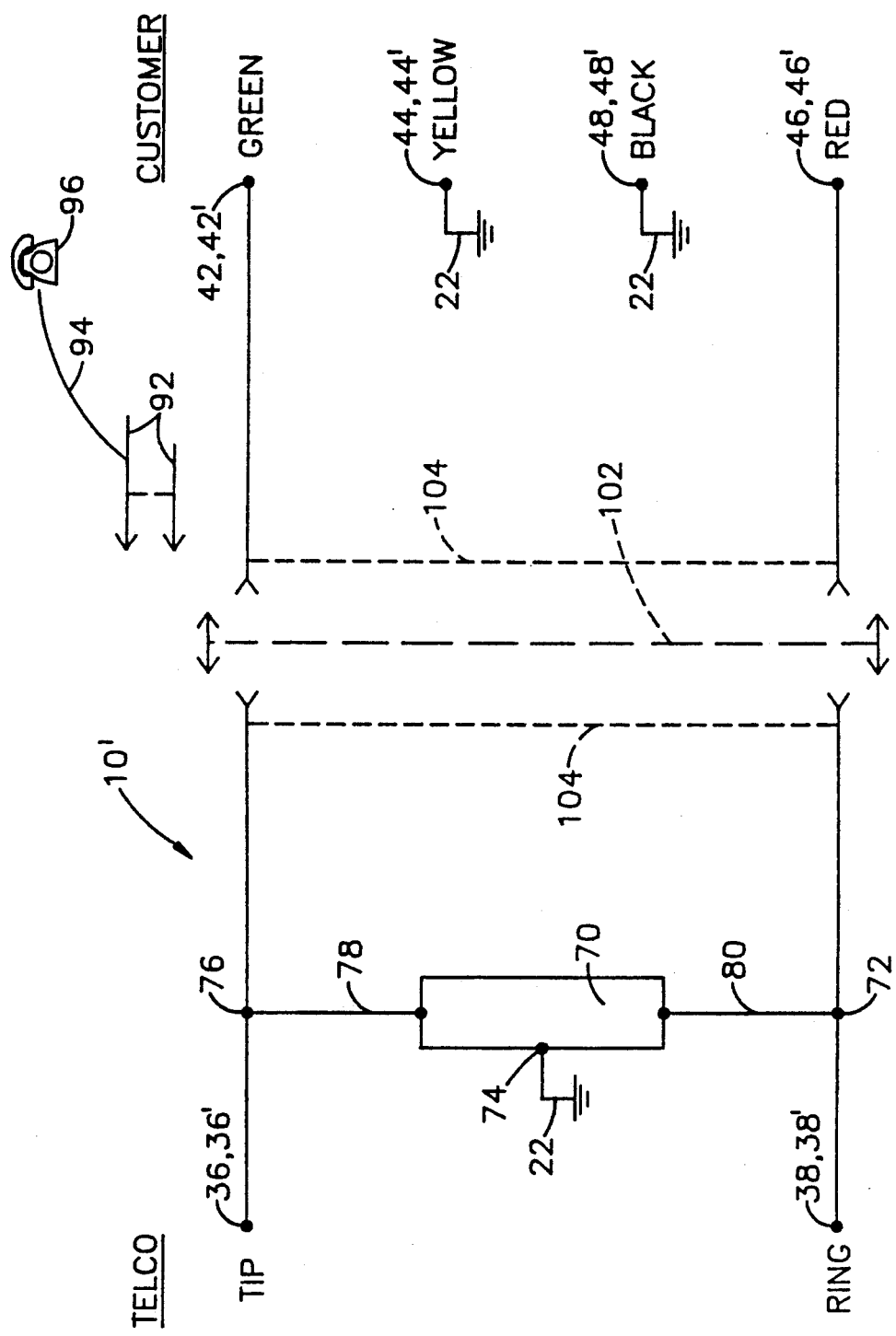
FIG. 18 is an electrical schematic circuit diagram of a module without the signature identification being included therein and a connect apparatus which connects the telephone company lines to the customer's portion of the telephone loop.
Figure 19:
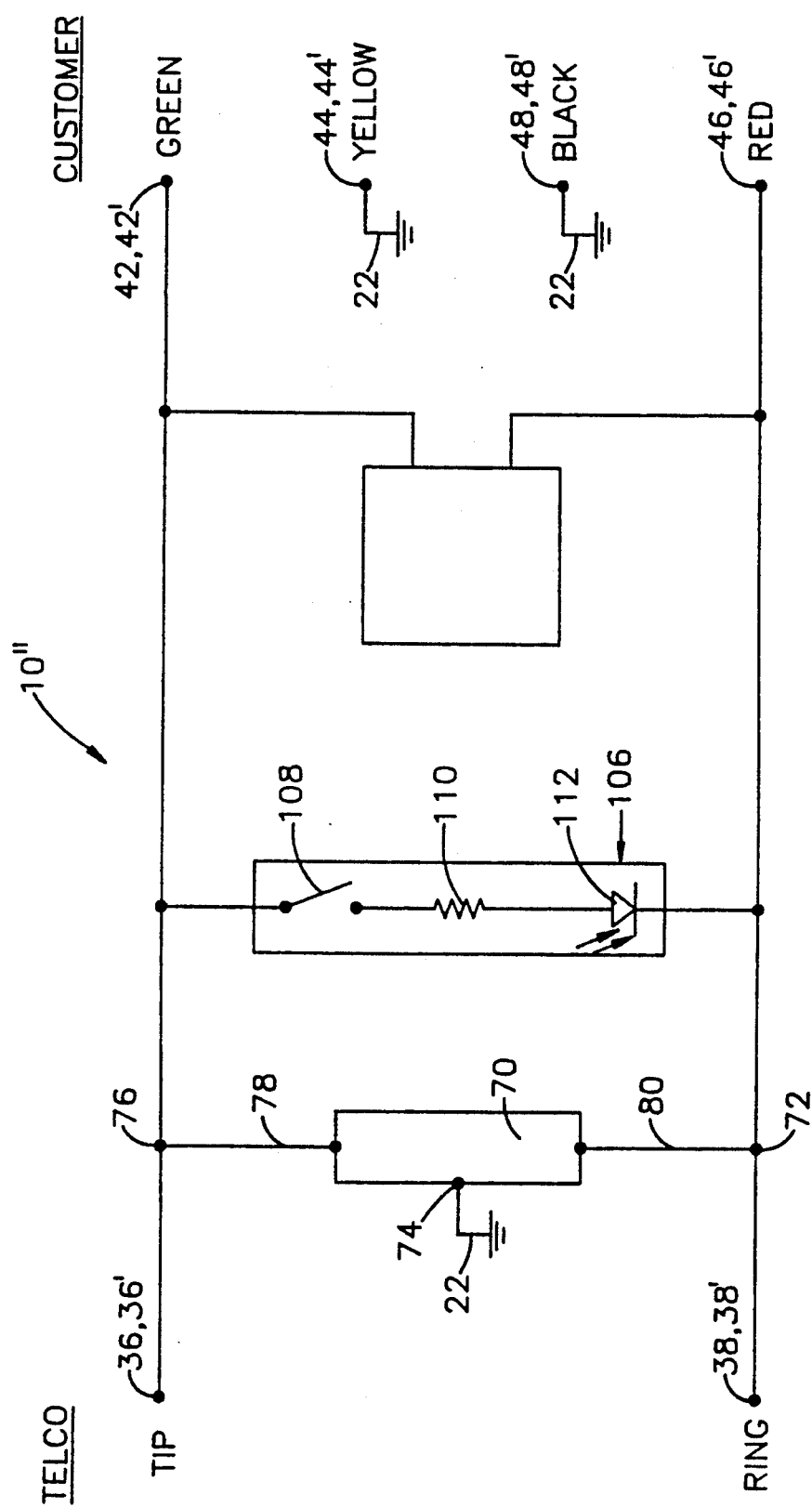
FIG. 19 is an electrical schematic circuit diagram of the second alternative embodiment of a weatherproof telephone interface module including a push to test illuminating switch which tests the telephone company lines.

A terminal board 82, which is preferably of the printed circuit type, has housed thereon a plurality of components including a zener diode 84, resistors 86 and 88 and a capacitor, not shown, which are connected in a conventional manner as shown in FIGS. 17, 18 and 19. Conventional wiring is used in order to provide the electrical conducting paths from the input line terminals 36 and 38 to the customer terminals provided in terminal members 40 and 50. The electrically conducting wires have been omitted for clarity so that one may more readily see the configuration of the components in the hollow module housing 12. Terminals 40 and 50 are similar in construction to terminal 30 and are preferably not provided with the test points 32 and 34, since they are generally not necessary or required.

The terminal board 82 may include additional components in order to provide the signature characteristic on the transmission line. Such devices are known as the 807D1 MTU (maintenance test unit) manufactured by TII Industries, Inc., of Copiague, N.Y. or the 856D1(one-half ringer) manufactured by the same company which may be connected as disclosed in FIGS. 17, 18 and 19.

Figure 9:
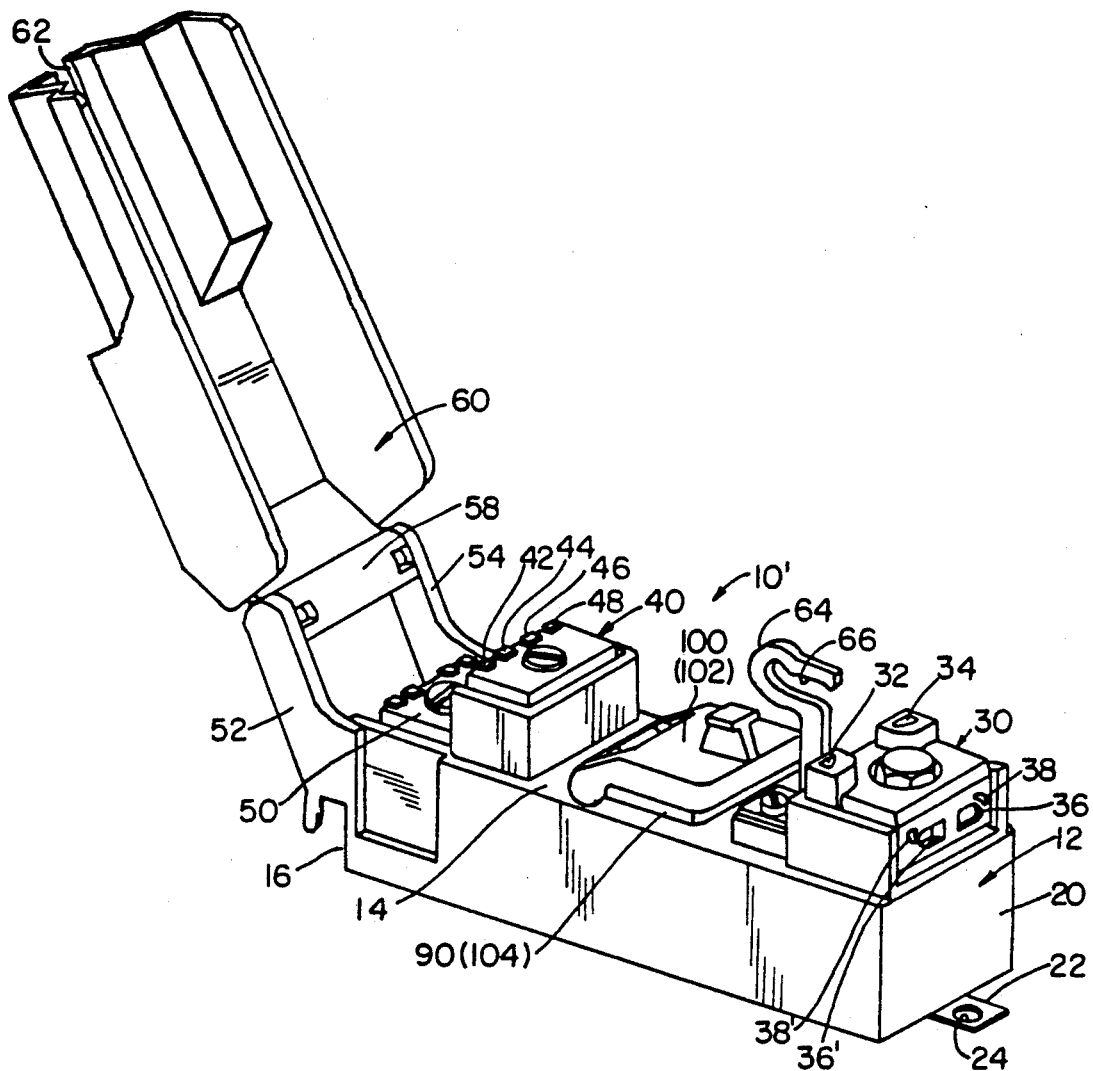
FIG. 9 is a perspective view of a first alternative embodiment of a weatherproof telephone network interface module with its cover open.

Referring now to FIGS. 9, 10, 11 and 12, it can be seen that with the cover 60 closed the first alternate embodiment of the subject invention would look the same as that shown in FIG. 1, however, it will be noted that in FIG. 9 there is provided a socket 90 disposed on the top surface 14 of the module housing 12, which is similar to the well known telephone socket RJ11 that is adapted to receive the conventional telephone plug known as a RJ11 plug, however, the socket is of a different design and is similar to that disclosed in U.S. Pat. No. 5,030,123 issued to C. K. Silver on Jul. 9, 1991, which has contact fingers that are touching to provide and electrically conducting path from the telephone input and ring lines 36, 38 and 38' 38' to the customer portion of the subscriber loop connected to terminals 42 and 46; and 42' and 46', as is shown in FIG. 17. A conventional telephone plug 92 disposed on the end of a cable 94 that is connected to a test telephone 96 may be inserted into socket 90 and break the electrically conductive path from the input telephone lines at the terminals 36 and 38 to the output terminals 42 and 46, thereby separating the telephone input lines from the customer portion of the subscriber loop. However, until a test of the telephone line portion of the subscriber loop is required a cap member 100 is placed over socket 90 to seal out the elements so that the socket 90 is impervious to the elements making it weatherproof also.

Figure 10:
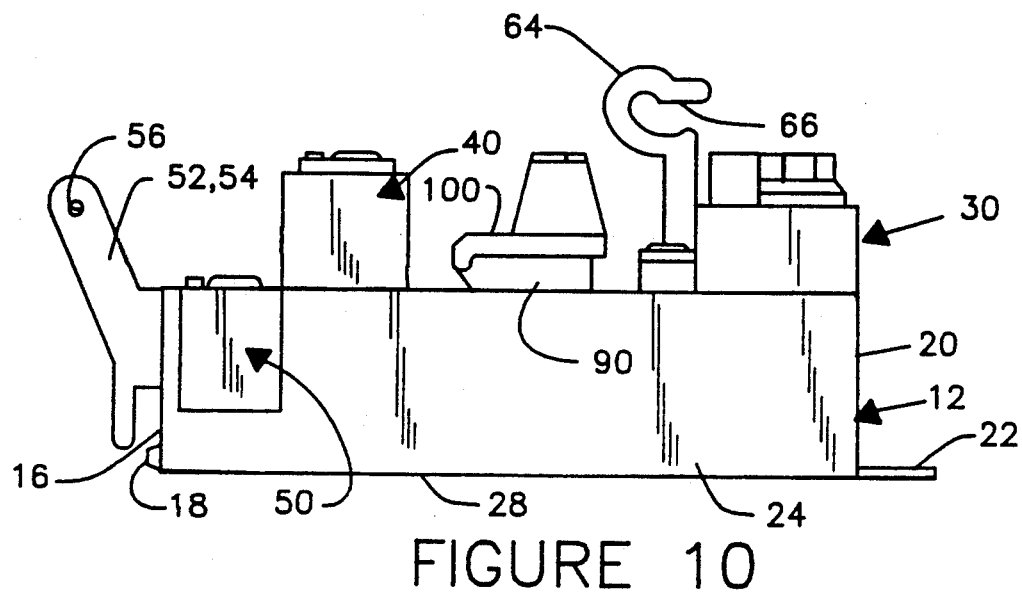
FIG. 10 is a left side view in elevation of the module shown in FIG. 9.
Figure 11:
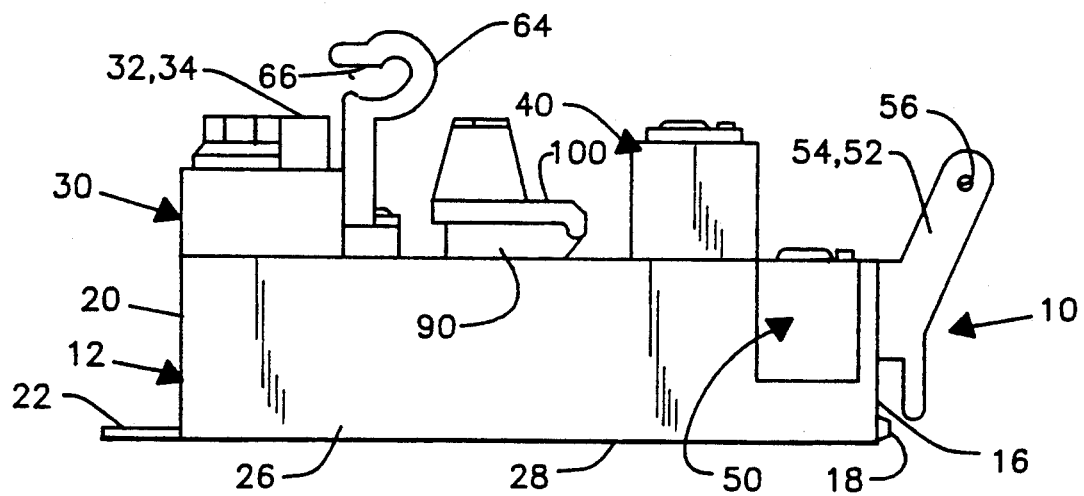
FIG. 11 is a right side view of the module shown in FIG. 9.

The remaining elements of the weatherproof module housing 12 is constructed exactly the same as disclosed in the description set forth hereinbefore with regard to FIGS. 1 through 6 and thus, is completely interchangeable with the original embodiment disclosed. Thus, it can be seen that FIGS. 9, 10 and 11 are different from the earlier embodiment disclosed only by the inclusion of the socket 90 and the cap 100 and the wiring thereof as disclosed in FIG. 17 which will be described hereinafter in detail.

It is also to be noted by those knowledgeable in the art that the socket 90 may be provided with electrically conducting contacts which do not complete the electrically conductive path from the telephone company lines connected to the input telephone company line terminals 36 and 38 (tip and ring respectively) to the customer portion of the subscriber loop or output terminals 42 and 46 so that in order to complete the electrically conductive path a conductive cap member 102, which is provided with a plurality of electrically conductive paths thereon, connects the conductors of socket 104 connected to the terminals 36 and 38 to terminals 42 and 46. Therefore, the conductive cap member 102 provides both the electrically conductive path from the telephone line input terminals 36 and 38 to the customer's or output terminals 42 and 46 as well as providing a weatherproof seal over the non-conducting socket 104 (see FIG. 18). Thus, in order to test the telephone company lines, the conducting cap member 102 would be removed from the socket 104 and the telephone plug 92 would be inserted into the non-conducting socket 104 giving access to the telephone company lines at terminal 36 and 38 while disconnecting terminals 42 and 46 from the subscriber loop.

The operation of this embodiment will be described more fully hereinafter.

Figure 12:
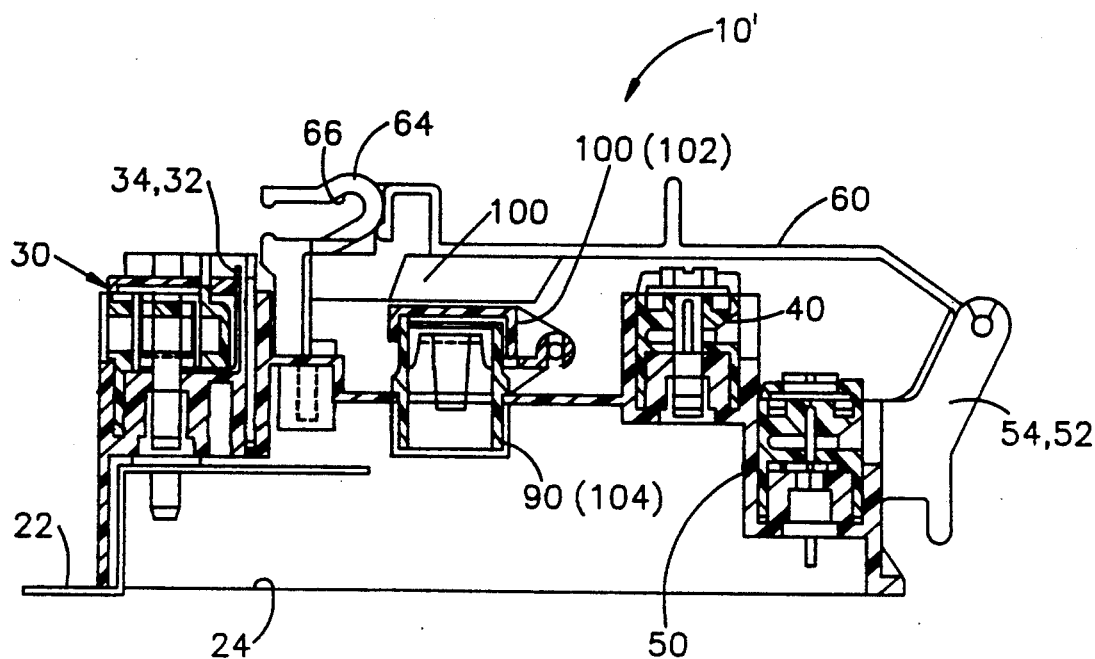
FIG. 12 is a partially cross-sectional view of the first alternative embodiment shown in FIG. 9 showing the location of the weatherproof terminals.
Figure 13:
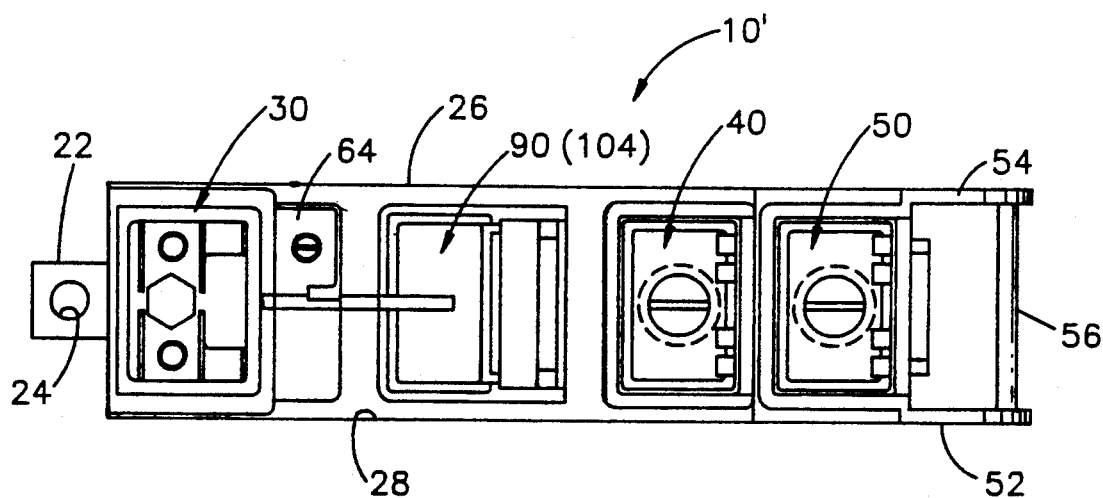
FIG. 13 is a top plan view of the first alternative embodiment shown in FIG. 12.

Referring now to FIGS. 12 and 13, there is disclosed a cross section of the weatherproof terminal suitable for receiving the wires for the telephone portion of the subscriber loop, not shown, the conductive socket 90 and customer terminals 40 and 50. As hereinbefore described in detail in conjunction with FIG. 9, the printed circuit terminal board 82, zener diode 84 and mounting components have been omitted for clarity, but it is to be understood that they are positioned and mounted as hereinbefore described with regard to FIG. 8.

FIG. 13 is a top plan view of the first alternative embodiment 10' of the weatherproof telephone interface module and is seen to be constructed similar to the weatherproof module 10 as described hereinbefore except for the inclusion of the conductive socket 90 or alternatively, non-conductive socket 104.

Figure 14:
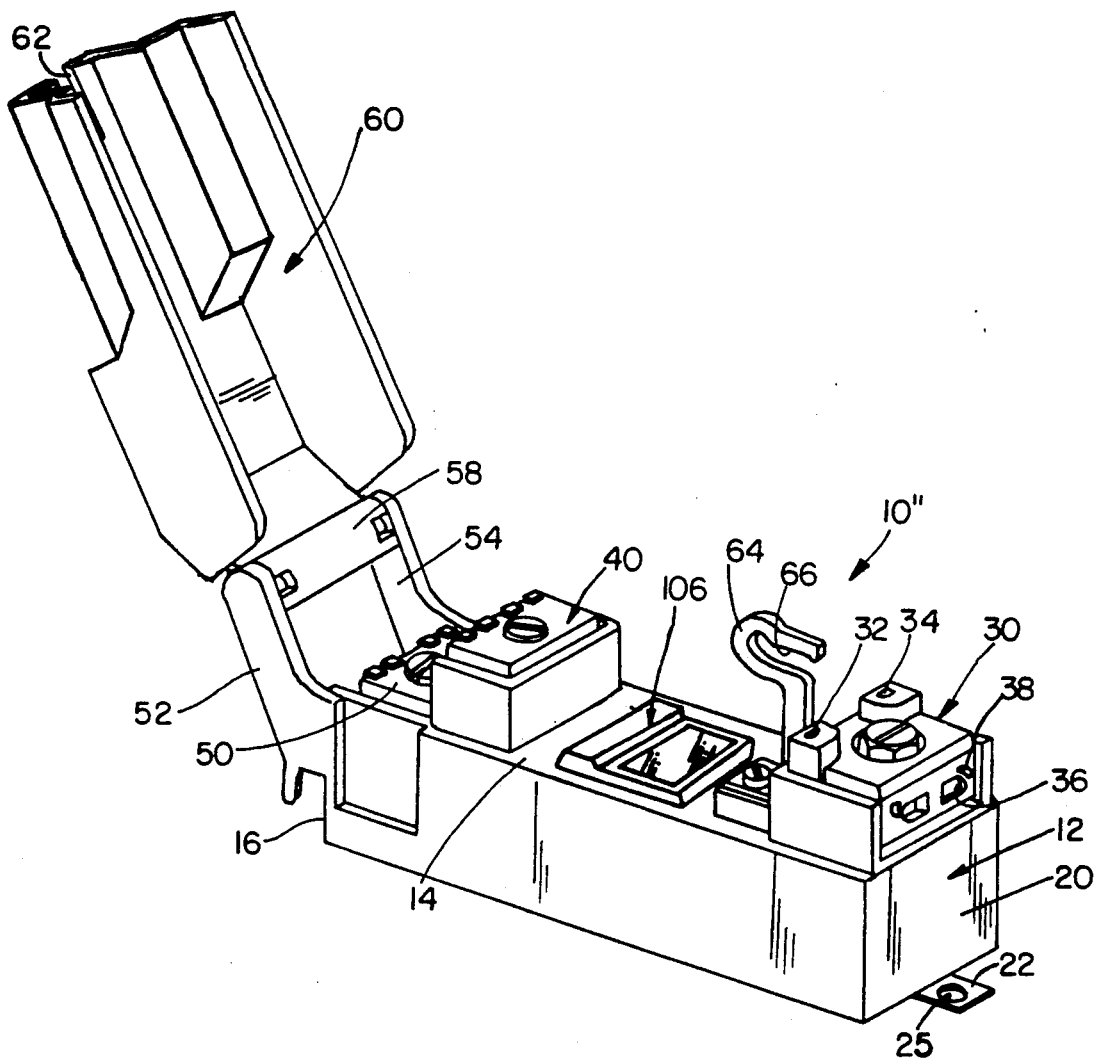
FIG. 14 is a perspective view of a second alternative embodiment of a weatherproof telephone network interface module with its cover open.
Figure 15:
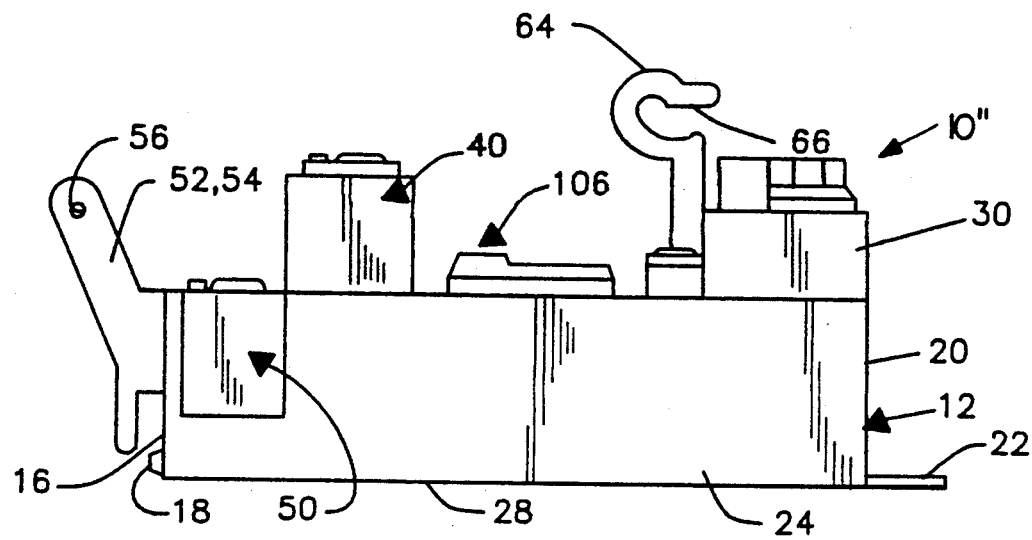
FIG. 15 is a left side view in elevation of the second alternative embodiment shown in FIG. 14.
Figure 16:
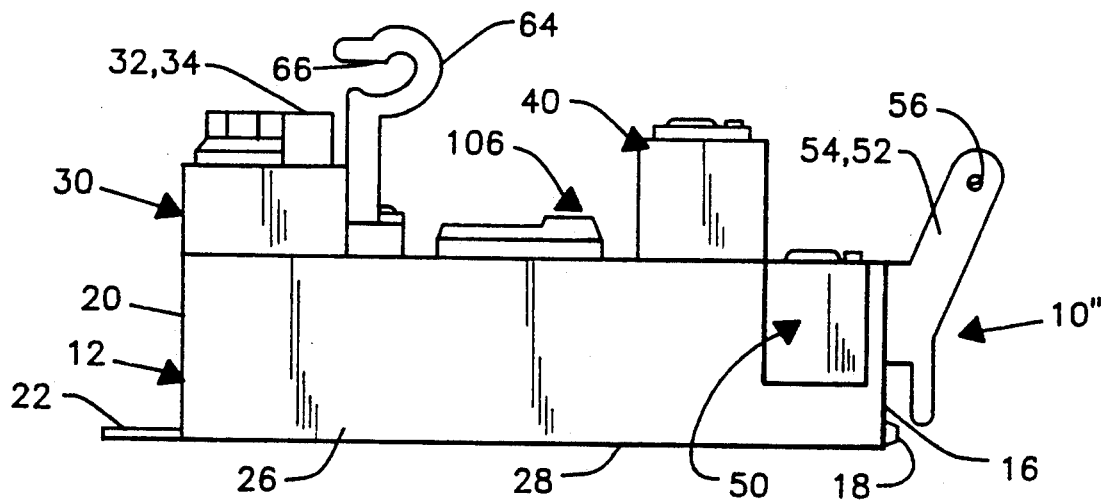
FIG. 16 is a right side view in elevation of the embodiment shown in FIG. 14.

A second alternative embodiment is disclosed in FIG. 10". It is to be seen that the module 10" is similar in construction to the embodiment shown in FIG. 2 except for the inclusion of an illuminated test light 106 and thus, the views set forth in FIGS. 14, 15 and 16 show the same location of the weatherproof test terminals 30, 40 and 50 and is clearly interchangeable with the other weatherproof modules disclosed hereinbefore. The operation of the second alternative embodiment will be discussed in more detail in conjunction with the description of FIG. 19 hereinafter.

Referring now to FIG. 17 which is an electrical schematic circuit diagram of the general wiring of the weatherproof telephone interface module 10 and/or the alternative embodiment 10".

It is to be noted that although the description of the electric circuit diagrams have been described with relation to one embodiment or the other, the features set forth therein may readily be incorporated into any of the other modules depending on the features desired or required.

It is to be seen in FIG. 17 that the telephone company's portion of the subscriber loop would be connected to the tip and ring terminals 36 and 38, respectively of the module 10 and is wired in a conventional manner through conductive socket 90 to the customer portion of the loop connected to terminals 42 and 46, the remaining terminals of the customer loop 44 and 48 are connected to a conventional ground. Socket 90 is of a special design wherein the input finger contacts are in contact with the output finger contacts to provide a continuous electrically conductive path as disclosed in U.S. Pat. No. 5,030,123 referred to earlier.

Across the tip and ring telephone lines (input), terminals 36 and 38 is placed a three terminal overvoltage protection device 70, which may be a solid state device or a gas filled tube, such as the Model No. 11 or 31 manufactured by TII Industries, Inc. of Copiague, N.Y. The central or ground terminal 22 is connected to ground with one terminal thereof connected, via conductive bracket 78 to the tip side of the line 76. The other terminal of overvoltage protection device 70 is connected via a conductive bracket 80 to the other (ring) side of the telephone line, thereby, protecting the consumer equipment connected to terminals 42 and 46 from any overvoltage surges which appear on the line.

Connected across the telephone company lines appearing across terminal 36 and 38 may also be a maintenance termination unit circuit arrangement disposed on terminal board 82 such as the 807D1 manufactured by TII Industries, Inc., of Copiague, N.Y.

Figure 2:
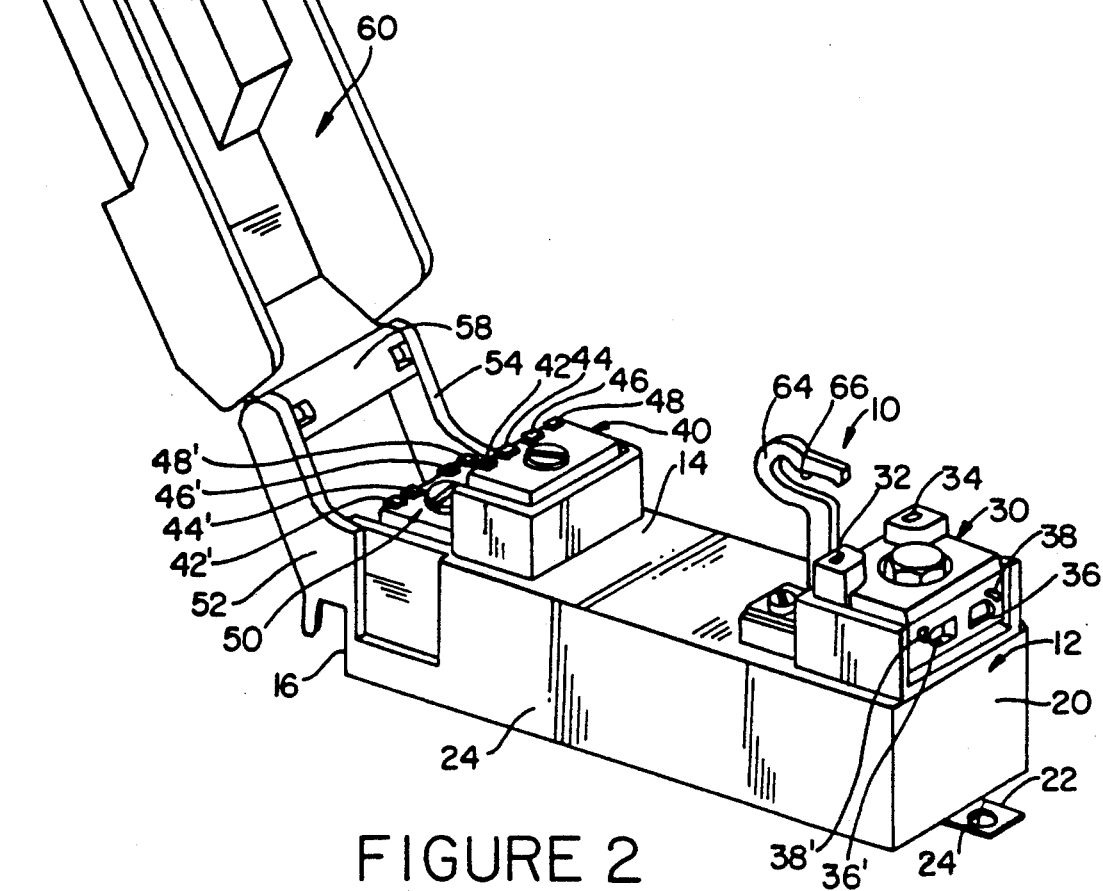
FIG. 2 is a perspective view of one embodiment of a weatherproof telephone network interface module with its cover open.
Figure 3:
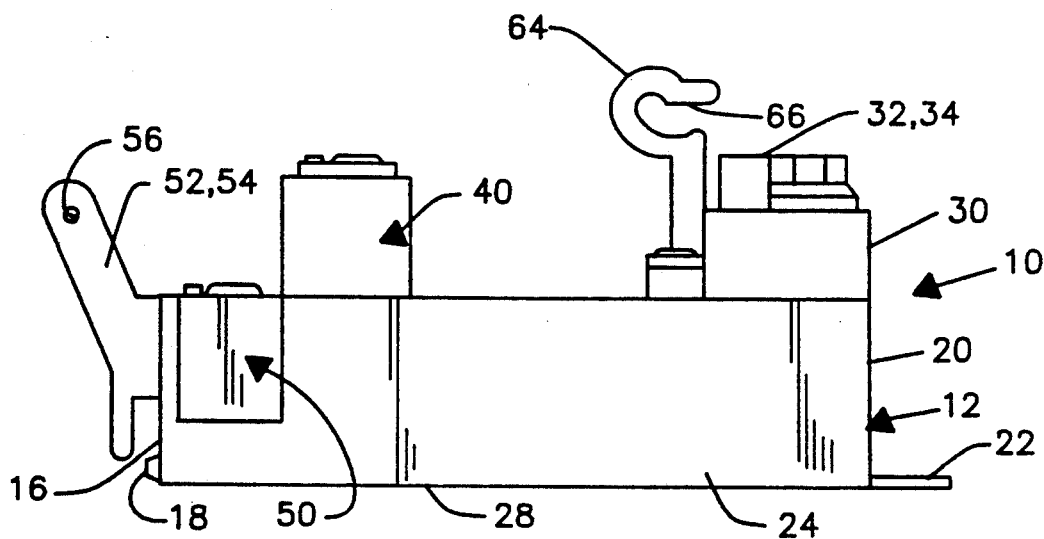
FIG. 3 is a left side view in elevation of the weatherproof telephone interface module with its cover removed.
Figure 4:
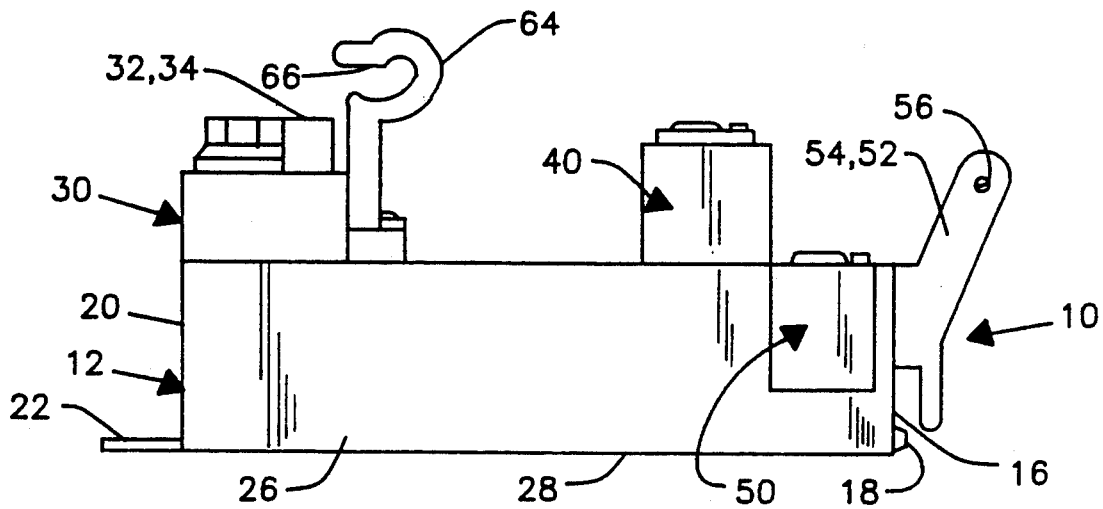
FIG. 4 is a right side view in elevation of the weatherproof telephone interface module with its cover removed.
Figures 5, 6:
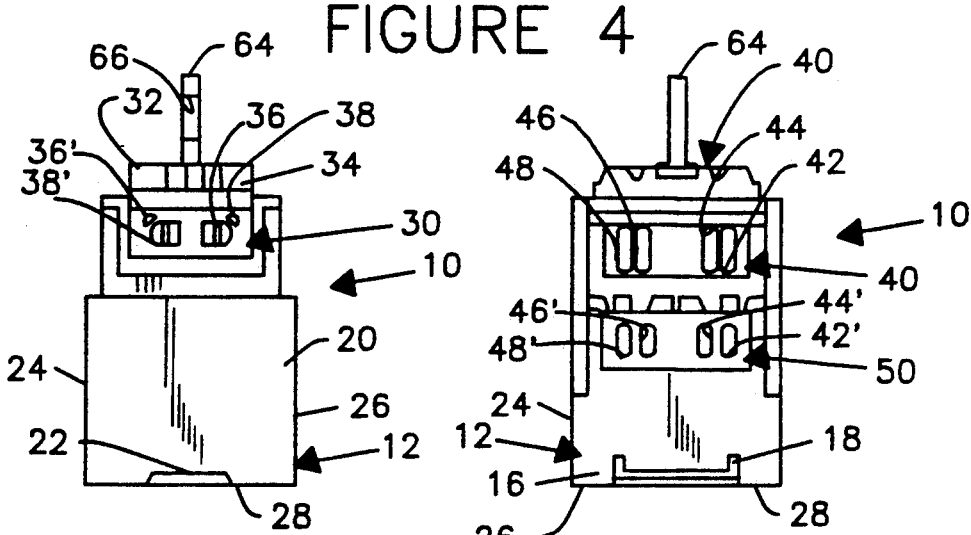
FIG. 5 is a front view of the weatherproof telephone interface module shown in FIG. 2.
FIG. 6 is a rear view in elevation of the weatherproof telephone network interface module shown in FIG. 2.
Figure 7:
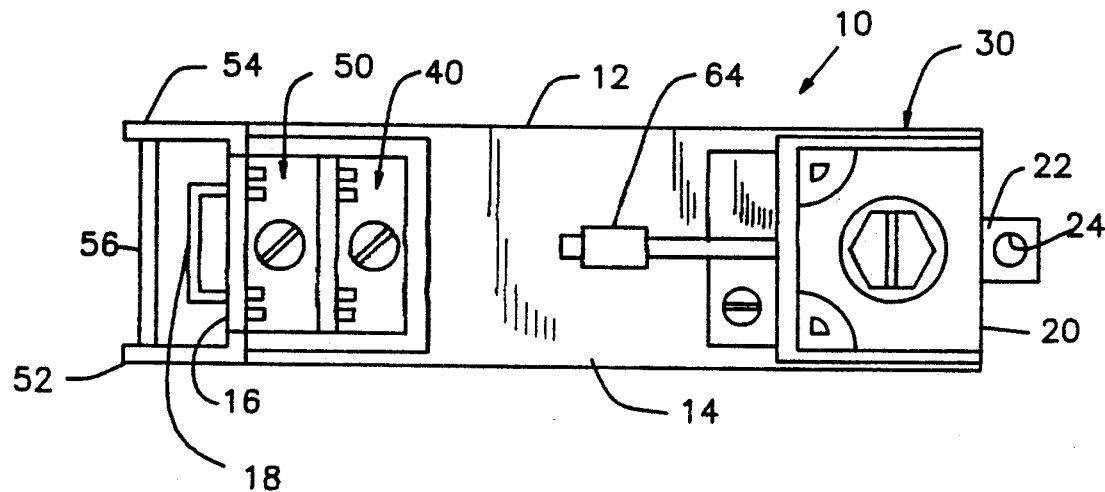
FIG. 7 is a top plan view of the module shown in FIG. 2.
Figure 8:
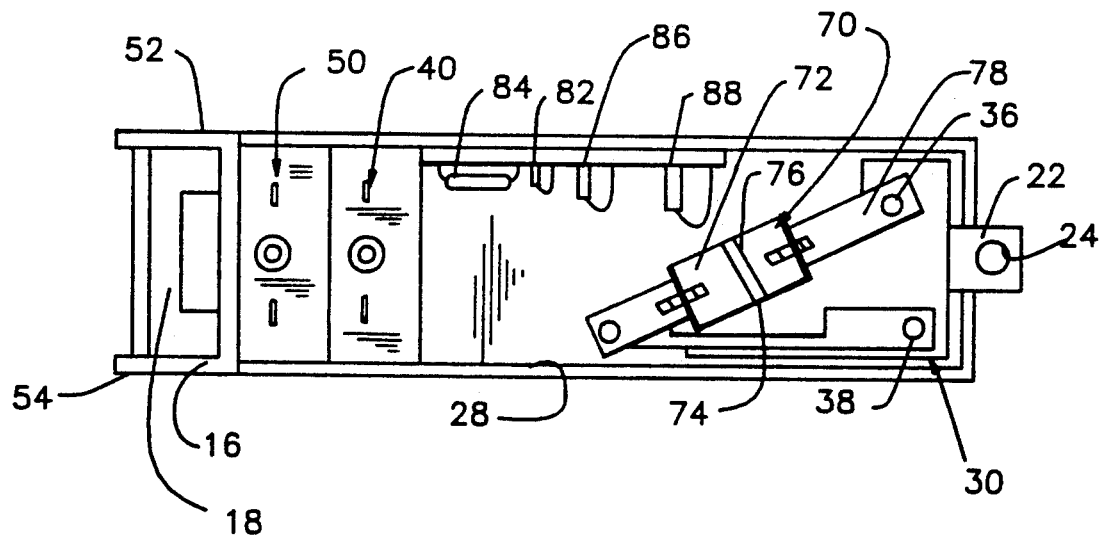
FIG. 8 is a bottom plan view of the module shown in FIG. 2, including an overvoltage protection device and a terminal board assembly.

If the embodiment disclosed in FIGS. 1 and 2 are to be used, then the socket 90 would not be utilized and there will be no need for the insulated cap member 100 to be used.

If the embodiment shown in FIG. 9 were to be utilized then either a conductive socket 90 or a non-conductive socket 104 would be utilized together therewith. The conductive socket 90 requires an insulated weatherproof cap member 100 to be placed thereover to insure the weatherproofing of the socket and thus, the complete module.

If a non-conductive socket 104 is utilized, then there is no continuity from the telephone company lines connected to terminals 36 and 38 to terminals 42 and 46 which are connected to the customer portion of the telephone loop. In order to achieve a complete electrically conductive path a conductive cap member must be utilized such as shown in FIG. 18. Inserting the conductive cap member 102 over the non-conductive socket 104 completes an electrically conductive path from the input to the output. Removing the cap member isolates the input terminals 36 and 38 from the output terminals 42 and 46.

FIG. 17 additionally shows the electrical schematic circuit diagram of a line termination impedance circuitry 114 such as the 856D1 mentioned hereinbefore,, which is mounted on the printed circuit terminal board 82, in a conventional manner. The circuitry 114 includes a resistor 116, preferably having a value of 15,000 ohms, two zener diodes 118 and 120, preferably have a breakover voltage of 4.3 volts and a capacitor 122, preferably 0.47 ufd, all connected in a series current carrying path across the telephone company weatherproof line terminals 36 (tip) and 38 (ring).

The resistor 116 diode 118 and diode 120 are connected in a serial path between terminals 36 and 38 with the cathode of the zener (breakover diode) 118 being connected to one end of the resistor 116 with the other end of the resistor 116 being connected to terminal 36. The cathode of zener diode 120 is connected to terminal 38 and capacitor 122 is connected between the anode of zener diode 120 and the anode of zener diode 118.

The line terminating impedance provided by the circuit arrangement 114 allows the telephone company to monitor the impedance across the line whether or not the customer has a telephone connected to the line with a proper interrogating signal.

The circuit terminal board 82 may also have mounted thereon a half ringer circuit arrangement, not shown. Resistor 116 and capacitor 122 are chosen to provide twice the impedance of a typical telephone ringer. By varying the voltage of the measurement signal above and below the threshold of the zener diodes 118 and 120 the telephone central office can determine if this device is present on the line.

Referring now to FIG. 18 one can readily see the connections therein are identical with that shown in FIG. 17 except for the use of the non-conductive socket member 104 requiring the conductive cap member 102 to be inserted therein in order to complete the circuit path from input to output.

FIG. 19 discloses the second alternative embodiment and includes the use of an illuminated test light 106 which includes a push to test switch 108, resistor 110 and a light emitting diode (LED) 112 connected across the input lines which are connected to terminals 36 and 38. Also included therein is the three terminal overvoltage protection device described earlier. In addition, included across the telephone input lines connected to terminals 36 and 38 is an 807D1, MTU (maintenance termination unit) manufactured by TII Industries, Inc., of Copiague, N.Y.

In order to test the functioning of the push to test light, one may readily push the switch 108, which applies the voltage appearing across the telephone line terminals 36 and 38 to illuminate the LED. If the LED 112 does not become illuminated when the push to test switch 108 is pressed, it would indicate that there is no voltage appearing across the line and thus, there would either be a short appearing on the customer side of the line across terminals 42 and 46 or a failure of the voltage being supplied from the telephone company. If this circuit arrangement is connected with a socket arrangement as discussed earlier, the input and output lines can be severed readily. If the socket arrangement is not utilized then it would be necessary to disconnect the customer equipment connected across terminals 42 and 42'; if LED 112 is illuminated on the pressing of the switch 108 then there is a short in the customer equipment connected across terminals 42 and 46. If there still is no illumination with the customer equipment removed, it is safe to say that the telephone company lines connected to terminals 36 and 38 are defective, since they are not applying the voltage normally appearing there.

As stated earlier, although the particular features have been shown relating to a particular embodiment set forth herein, it is to be remembered that the schematics as shown may be readily modified to incorporate variation in the number of features which may be utilized in any of the modules and thus, the variations from one module to another would occur depending on the requirements desired. For example, if one were to isolate the input from the output prior to connecting the module to the telephone line it would be necessary to decide if the circuit between input and output were to be left open (broken conductive path) or closed (completed electrically conductive path) without a cap member. If a cap member is to be utilized it can be of the conductive type so that the input to output electrically conductive path is completed where the cap is applied removing the cap will break the electrically conductive path.

It is contemplated that the hollow housing module may be filled with a potting compound such as Biwax 622 manufactured by the Biwax Corp., Des Plaines, Ill. to prevent any moisture from entering the open bottom of the module. In addition, a non-conductive gel is used for filling any air voids found in terminals 30, 40 and 50. This will insure an environmentally protected termination of the wires inserted into the terminals.

In operation, if the telephone portion of the customer loop is to be separated from the customer equipment one may utilize a conventional telephone plug connected to an operable telephone and remove the conductive or non-conductive cap and insert it into the socket member, whether it be conductive or non-conductive. The non-conductive member would make contact with the fingers on the telephone plug and thus the telephone 96 would have access to the telephone company lines and a determination can be made if the lines are in operating order.

Insertion of the telephone plug 92 into a conductive socket 90 would also break the connection between input and output when inserted into the socket and the fingers on the plug would come into contact with the fingers on the socket 90 separating the input from the output fingers within the socket.

If separating the input from output conductive paths are not required since the weatherproof terminals utilize and accept insulated wires, there is no open surface carrying any voltage and thus the technician or customer would be safe from any shock appearing on the lines.

Hereinbefore has been disclosed is weatherproof telephone interface module which embodiments disclosed may be readily interchanged one with the other and may be exchanged with those presently in the field. Since the present configuration is weatherproof there is no absolute necessity that they be placed in a telephone terminal housing. It will be understood that various changes in the details, materials, arrangement of parts and operating conditions which have been herein described and illustrated in order to explain the nature of the invention may be made by those skilled in the art within the principles and scope of the instant invention.

Having thus set forth the nature of the invention, what is claimed is:

1. A weatherproof telephone network interface module, suitable for use in a telephone terminal housing, for providing connections between a customer's equipment and the telephone company owned portion of a customer loop, comprising:
   a) hollow housing means, said housing means being provided with a rear surface having a protruding portion thereon suitable for cooperating with a ledge provided in said telephone terminal housing, a front surface having a protruding portion for removably mounting said module to said telephone terminal housing, two side surfaces, an open bottom surface and a top surface;
   b) first weatherproof terminal means, disposed on said top surface proximate said front surface of said hollow housing means, having at least a pair of line terminals adapted to receive a pair of wires connected to said telephone company owned portion of said customer's telephone loop;
   c) second weatherproof terminal means disposed on said top surface proximate said rear surface of said hollow housing means, said second terminal means having at least a pair of terminal connections thereon adapted to be connected to said customer's equipment;
   d) third weatherproof terminal means disposed on said rear surface of said module, said third terminal means having at least a pair of terminal connections thereon adapted to be connected to said customer's equipment;
   d) overvoltage protection means disposed within said hollow housing, said protection means having three terminals, one of said terminals being connected to a ground means, said second and third terminals being connected to each of said weatherproof line terminals; and
   e) circuit board means disposed within said hollow housing, said circuit board means being connected to said second and third weatherproof customer terminal connections.

2. A weatherproof telephone network interface module, according to claim 1, further including line termination impedance means disposed on said circuit board means connected to said second and third weatherproof customer terminal connections.

3. A weatherproof telephone network interface module, according to claim 1, wherein said housing means further includes cover means, said cover means being removably affixed to extension means provided on said rear surface, for covering said second and third weatherproof terminal means.

4. A weatherproof telephone network interface module, according to claim 1, wherein said open bottom surface is sealed by a potting compound.

5. A weatherproof telephone network interface module, according to claim 2, wherein said line termination impedance means includes a series current path comprising:
   a) a resistor having one end thereof connected to one terminal of said second terminal means,
   b) a first zener diode having a cathode and an anode said cathode being connected to the other end of said resistor,
   c) a second zener diode having an anode and a cathode, said cathode being connected to the other terminal of said second terminal means, and
   d) a capacitor, said capacitor having one end connected to the anode of said first zener diode and the other end being connected to the anode of said second zener diode.

6. A weatherproof telephone network interface module, according to claim 5 wherein said first and second zener diodes have a breakover voltage of approximately 4.3 volts, said resistor is approximately 15,000 ohms and said capacitor is 0.33 ufd or greater.

7. A weatherproof telephone network interface module, according to claim 1, wherein said housing means further includes socket means disposed on the top surface of said hollow housing means and cap means adapted to cooperate with and weatherproof said socket means.

8. A weatherproof telephone network interface module, according to claim 7, wherein said socket means includes electrically conductive contacts that complete the electrically conductive path from said weatherproof line terminals to said customer line terminals and said cap means is an insulator, placing a telephone plug into said socket means breaks the electrically conductive path from said weatherproof telephone line terminals to said customer line terminals.

9. A weatherproof telephone network interface module, according to claim 7, wherein said socket means includes electrically conductive contacts that do not complete the electrically conductive path from said weatherproof line terminals to said customer line terminals and said cap means is an insulator having a plurality of electrically conductive paths, placing said insert means into said socket means continues the electrically conductive paths from said weatherproof telephone line terminals to said customer line terminals.

10. A weatherproof telephone network interface module, according to claim 1, wherein said housing means further includes illuminating test means, said test means illuminating when depressed if said telephone company owned portion of a customer loop is operating properly.

* * * * *